US006749945B2

United States Patent
Knobbe et al.

(10) Patent No.: US 6,749,945 B2
(45) Date of Patent: Jun. 15, 2004

(54) ADVANCED COMPOSITE ORMOSIL COATINGS

(75) Inventors: Edward T. Knobbe, Stillwater, OK (US); Olga Kachurina, Stillwater, OK (US); Tammy L. Metroke, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 0 days.

(21) Appl. No.: 10/060,980

(22) Filed: Jan. 29, 2002

(65) Prior Publication Data

US 2003/0012971 A1 Jan. 16, 2003

Related U.S. Application Data

(60) Provisional application No. 60/264,853, filed on Jan. 29, 2001.

(51) Int. Cl.$^7$ .............................. B32B 15/04; C08L 83/02
(52) U.S. Cl. ...................... 428/450; 428/447; 428/336; 106/14.05; 106/14.44; 106/287.16; 524/858; 524/859
(58) Field of Search ................ 428/446, 447, 428/448, 450, 336; 427/387, 376.2; 106/14.05, 287.16, 14.44; 516/78, 79; 528/10, 12, 14, 32, 33, 34, 39; 524/858, 859

(56) References Cited

U.S. PATENT DOCUMENTS

| | | | | |
|---|---|---|---|---|
| 3,975,203 A | * | 8/1976 | Dietz | 106/438 |
| 4,840,666 A | | 6/1989 | Schmidt et al. | 106/14.05 |
| 5,112,884 A | * | 5/1992 | Hanke | 523/116 |
| 5,254,411 A | | 10/1993 | Takeda et al. | 428/447 |
| 5,551,994 A | | 9/1996 | Schriever | 148/273 |
| 5,695,592 A | | 12/1997 | Rouaud et al. | 156/276 |
| 5,731,091 A | | 3/1998 | Schmidt et al. | 428/428 |
| 5,766,680 A | * | 6/1998 | Schmidt et al. | 427/226 |
| 5,873,953 A | | 2/1999 | Schriever | 148/273 |
| 6,419,989 B1 | * | 7/2002 | Betz et al. | 427/385.5 |
| 6,472,467 B1 | * | 10/2002 | Chiao | 524/755 |
| 2001/0051672 A1 | * | 12/2001 | Albert et al. | 523/116 |
| 2001/0056197 A1 | * | 12/2001 | Albert et al. | 556/9 |

FOREIGN PATENT DOCUMENTS

| | | |
|---|---|---|
| DE | 3536716 A | 4/1987 |
| DE | 19706515 A | 8/1998 |
| DE | 19813709 A1 | 9/1999 |
| DE | 19857316 A1 | 6/2000 |
| DE | 19857317 A1 | 6/2000 |
| DE | 19917366 A1 | 10/2000 |
| WO | WO-00/16912 * 3/2000 | B05D/7/00 |

OTHER PUBLICATIONS

Semiconductor Online: Product Description of "Spin-on--Glass" by Honeywell.*

* cited by examiner

*Primary Examiner*—Philip Tucker
*Assistant Examiner*—Michael J Feely
(74) *Attorney, Agent, or Firm*—Fellers, Snider, Blankenship, Bailey & Tippens, P.C.

(57) ABSTRACT

An Ormosil composite coating that provides good corrosion and abrasion resistance of the underlying substrate. The Ormosil composite coating of the present invention is entrapped with a plurality of inorganic particles of a size greater than 1 micron to produce a coating of a sufficient, desired thickness. The coating of the present invention, generally includes an ormosil composite including a plurality of entrapped inorganic particles wherein each of the plurality of inorganic particles is at least one (1) micron in its maximum dimension but not greater than 75 microns (however, a maximum dimension of 5 microns is preferred).

25 Claims, 2 Drawing Sheets

ADVANCED COMPOSITE ORMOSIL COATINGS

CROSS REFERENCE TO RELATED APPLICATION

This application claims the benefit of copending U.S. provisional application Serial No. 60/264,853 filed Jan. 29, 2001.

STATEMENT REGARDING FEDERALLY SPONSORED RESEARCH

This present invention was funded by the U.S. Air Force under grant number R2CSR-98-D-SBIR. The U.S. government may have rights in this invention.

BACKGROUND OF THE INVENTION

1. Field of the Invention

This invention is in the field of corrosion and abrasion resistant coatings formed on metal, glass, or composite substrates, for example, aluminum alloys.

2. Background

The prevention, or reduction, of corrosion is of concern with most types of metals, including aluminum and steel which find broad use in, for example, the automotive and aviation industries. Corrosion will significantly affect the appearance and integrity of such metals and, if left unchecked, may even destroy a piece of metal. Accordingly, there are continual efforts in the field to improve on prior art anti-corrosion techniques.

One technique for reducing the occurrence of corrosion involves passivating the surface of a metal with a heavy chromate treatment. While such treatments have proven effective, unfortunately chromium is highly toxic, believed to be a carcinogen, and environmentally unfriendly. Recently, OSHA has determined that chromate-containing aerosols, such as those generated by large scale solution spraying constitute a serious health threat for workers that are exposed to such operations. Thus, the use of chromate is altogether undesirable.

Several anti-corrosion schemes have been suggested which avoid the use of chromate entirely. Of these, coatings comprising silane have shown a great deal of promise. However, such coatings are still evolving and suggested schemes typically attempt to balance a number of limitations such as adhesion to the substrate material, compatibility with paints, scratch resistance, abrasion resistance, immunity to solvents, and others.

Organically modified silicates (Ormosils), are well known hybrid organic-inorganic materials. Typically these materials are formed through the hydrolysis and condensation of organically modified silanes, $R-Si(OX)_3$, with traditional alkoxide precursors, $Y(OX)_4$, where X may represent, for example, $CH_3$, $C_2H_5$, $C_3H_7$, $C_4H_9$ and Y may represent, for example, Si, Ti, Zr, or Al. R may be any organic fragment such as methyl, ethyl, propyl, butyl, isopropyl, methacrylate, acrylate, vinyl, epoxide, and the like. As used herein, the term "Ormosil" encompasses the foregoing materials as well as other organically modified ceramics, sometimes referred to as Ormocers. Ormosils are often used as coatings where an Ormosil film is cast over a substrate material through, for example, the sol-gel process.

Ormosil films are often found in high-performance applications which require abrasion resistant, anti-soiling, and anti-fogging coatings. In addition, when used over metal substrates, Ormosil films have been found to form a dense barrier to the penetration of corrosion initiators and thus provide good corrosion resistance. Ormosil films are of particular interest in the area of corrosion resistance because they exhibit mechanical and chemical characteristics of both their organic and inorganic networks to produce films which are durable, scratch resistant, adherent to metal substrates, flexible, dense, and functionally compatible with organic polymer paint systems. As a result, Ormosil coatings have been found useful for the protection of metal surfaces from a variety of aggressive environments.

It should be noted that the sol-gel process is likewise known in the art and consists essentially of hydrolysis and condensation reactions originating from alkoxide and/or silane precursors to form a polymeric network. Simplified chemical reaction sequences are given by:

(1) Hydrolysis:

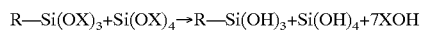

(2) Condensation:

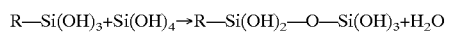

where: R=vinyl, methacrylate, epoxide, etc.
X=alkyl functionality or fragment.

Due to the rapid hydrolysis and condensation rates of metal or non-metal alkoxides derived from elements other than silicon in Ormosil preparation methods, the alkoxides typically form porous sub-micron sized particles within the ormosil matrix. These coatings are thin, generally less than 2–4 microns. While coatings prepared in this fashion provide good abrasion resistance characteristics, the air-sensitive nature of the parent alkoxides makes this coating preparation method less than desirable. A need thus exists for an Ormosil coating prepared from alkoxides which are not air sensitive and which incorporates inorganic particles of a larger size in order to produce a thicker, mechanically stable, film.

It is thus an object of the present invention to provide Ormosil films for enhanced abrasion and corrosion resistance of metal substrates.

SUMMARY OF THE INVENTION

The invention described herein provides composite Ormosil coatings having inorganic particles generally of a size ranging from about 1 micron to about 75 microns entrapped therein. Unlike prior art coatings, dense particles are added to the Ormosil solution, rather than formed in-situ during the sol-gel reactions. The size of the particles is substantially larger than that of the particles formed in the preparation of prior art Ormosil coatings and allows the preparation of a mechanically stable thicker film. Examples of suitable inorganic particles include oxides, nitrides, carbides, carbonitrides, and the like. The inventive coating thus improves the corrosion and abrasion protection over that of the underlying substrate material. In a preferred embodiment, the Ormosil film is applied to the substrate material through a sol-gel process wherein the application method may include brushing, sponging, spinning, dipping, spraying, or other liquid application method.

In another embodiment of the present invention there is provided a process for improving the corrosion resistance and abrasion resistance of metals prone to corrosion by application of an organic-inorganic coating system. The coating system comprises an Ormosil composite coating having inorganic particles entrapped therein. Corrosion resistance is obtained based on barrier properties of the Ormosil film. The films are prepared by mixing various silanes and organically modified silane reagents with acidified water. After stirring, the inorganic particles are added and the Ormosil material is deposited onto the surface of a substrate material. Thus, the present invention encompasses corrosion/abrasion protection based on the use of Ormosil films which incorporate inorganic particles as a coating for metal substrates. Such coating optionally may be used in conjunction with a conversion coating process.

In yet another embodiment of the present invention there is provided an abrasion resistant coating for a broad range of materials such as metals, glass, plastic, polymers, etc.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

DETAILED DESCRIPTION OF THE PREFERRED EMBODIMENT

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

Figure 1:
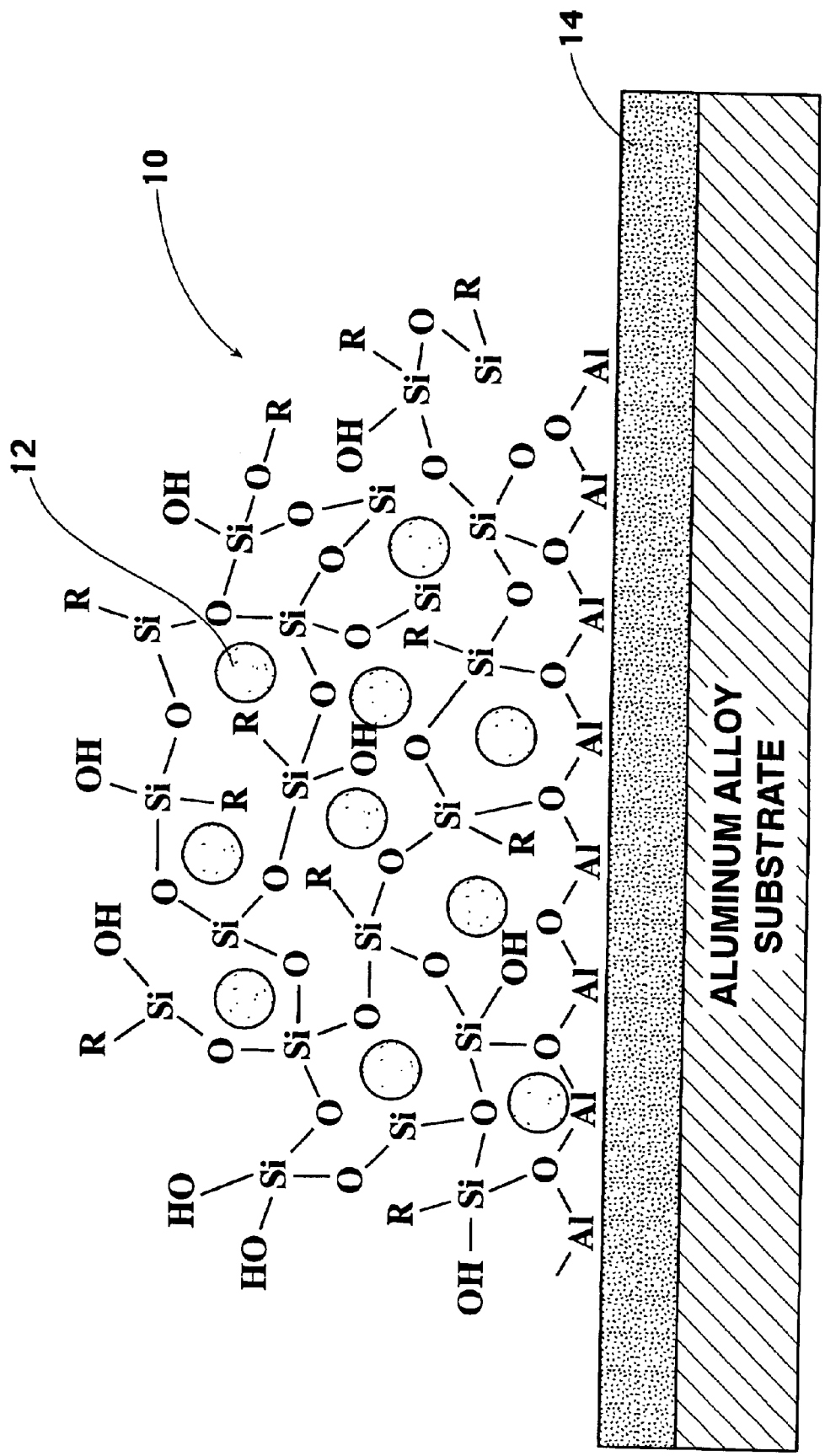
FIG. 1 generally illustrates a multilayer Ormosil composite entrapped with inorganic particles applied onto an aluminum alloy substrate.

Referring now to FIG. 1, there is illustrated an Ormosil composite coating, generally indicated by the reference numeral 10, containing inorganic particles 12. The underlying conversion coating 14 is optional, based on the desired corrosion resistance requirements. The particles improve the corrosion/abrasion resistance performance of the Ormosil composite coating by (a) densifying the composite coating and (b) increasing the mechanical hardness of the composite coating. When used in conjunction with an underlying conversion coating, a multilayer coating may be formed which provides a secondary mechanism of corrosion protection in the event that the integrity of the Ormosil composite coating incorporating inorganic particles is breached.

The coating of the present invention, generally includes:
an ormosil composite including a plurality of entrapped inorganic particles wherein each of the plurality of inorganic particles is at least one (1) micron. The size of the inorganic particles incorporated into the ormosil composite coating is in the range of one (1) to seventy-five (75) microns, however, the preferred particle size is in the range of one (1) to five (5) microns. It shall be understood that for the purposes of the present invention that these sizes are measured at the point of maximum dimension of the particle(s).

Dense sol-gel barrier Ormosil coatings and their preparation are well known. Their preparation is known as a sol-gel procedure because the mixture starts out as a liquid and then gels, becoming a solid. In connection with the present invention, such films may be prepared from the acid or base-catalyzed hydrolysis of a variety of alkoxides and organically modified silanes.

In a preferred method, without limitation thereto, Ormosil composite coatings can be prepared by mixing various silane and organically modified silane reagents with acidified water. The resulting mixture is then allowed to stir for a suitable period of time (approx. one hour) prior to particle addition. Once the suitable stirring has completed, dense inorganic particles are added and the solution is stirred for an additional period of time (approx. 30 minutes). The resulting Ormosil solution is then applied onto a cleaned substrate by a spray coating technique. It is understood, however, that the Ormosil coating entrapped with inorganic particles could also be applied to the metal substrate by spin or dip coating techniques generally known in the art.

Particles may be incorporated into the Ormosil composite coating depending on the degree of hardness/abrasion resistance required. These inorganic particles may be oxides, nitrides, carbides, carbonitrides and the like (for example, but not limited to, $TiO_2$, $ZrO_2$, $Al_2O_3$, SiC).

A variety of conversion coatings may be utilized (for example, but not limited to Alodine) depending on the corrosion resistance requirements. Recent developments have included rare earth-based conversion coatings, Co-rich oxide layers, Mn-based conversion coatings, Mo-based conversion coatings, Zr-based conversion coatings, silane-based surface treatments, and trivalent chromium conversion coatings which would also find use in connection with the present invention. The embedded inorganic particles disclosed herein are preferably non-porous and therefore are more dense than the small particles produced by the sol-gel process. The density of the particles has a significant affect on the characteristics of the resultant composite coating.

In addition to the size of the inorganic particles, the range of concentrations of particle composition for the present invention is between one (1) and ninety (90) wt. %. However, the preferred range of concentration is five (5) to thirty (30) wt. %.

The thickness of the inorganic particle entrapped ormosil composite coating can be varied as desired due to the size of the particles. Thick composite coatings (by comparison) are achievable through the use of larger particles as disclosed herein. For the purpose of the preferred embodiment, film thicknesses of approximately 10–26 microns are achievable to produce ormosil composite coatings containing embedded inorganic particles. Ormosil composite coating thicknesses can be (and were in the following example) measured using a digital DeFelsko Series 6000 coating thickness guage.

The large size of the inorganic particles as disclosed herein adds significant characteristics to the resulting ormosil composite coating as compared to the same coating without embedded particles. These characteristics include reduction in shrinkage, reduction in residual stress, reduction in solvent evaporation, and resistance to cracking. It has been found that the thickness of the composite coating including embedded particles affects is dependent on the viscosity of the applied coating and the solvent evaporation rate.

The present invention will be further understood by reference to the following non-limiting example.

EXAMPLE
Preparation of Ormosil Film Containing Entrapped Inorganic Particles

General Preparation Method.

Ormosil thin films were prepared by mixing various silane and organically modified silane reagents with acidified water. For the purpose of the present example, tetraethylorthosilicate (TEOS), vinyltrimethoxysilane (VTMOS), and 3-(trimethoxysilyl)propyl methacrylate (MEMO) were mixed with 0.05 M $HNO_3$. The mixture is allowed to stir for one hour prior to particle addition. Approximately 5–30 wt. % particles were added and the sol was stirred for an additional 30 minutes prior to film deposition. The Ormosil solutions were subsequently applied onto cleaned aluminum alloy (AA) by a spray coating technique using an airbrush setup. It is understood, however, that the Ormosil coating containing entrapped inorganic particles could also be applied to the metal substrate by spin or dip coating techniques generally known in the art.

Potentiodynamic Polarization Curve Analysis.

Electrochemical measurements were performed using a BAS CV-50-W unit and a three electrode cell equipped with a platinum counter electrode, a $Ag/AgCl/Cl^-$ (3M KCl) reference electrode and a coated or non-coated 2024-T3 AA panel as the working electrode with an exposed area of 0.36 $cm^2$. All measurements were conducted in aqueous 1M NaCl working solution at 25±1° C. The reported values of potentials of the polarization curves and listed in Table 1 are given relative to the $Ag/AgCl/Cl^-$ reference electrode. Oxygen was removed by purging the solution with purified nitrogen for approximately 30 minutes prior to the polarization measurements.

In order to reach steady potential, the electrodes were kept in the working solution for 30 minutes prior to analysis with the electrical circuit open. Then, the acquisition of polarization curves was started from this open circuit potential with a constant sweep of 1 mV/sec. Corrosion current values, $I_{corr}$, reported herein correspond to a 50 mV stretch between the cathodic and anodic parts of the polarization curve. Corrosion resistance was calculated using the equation $R_{corr} = 50$ mV/$2I_{corr}$. This approach corresponds to the theory of electrochemical processes and is in broad accordance with the ASTM G-59-97 standard for conducting potentiodynamic polarization resistance measurements. This method allows finding of the parameter $R_{corr}$ for the entire pool of polarization curves collected in this study regardless of their shift along the abscissa. Pitting potentials, $E_{pit}$, were determined using the criterion described by Kelly et al wherein pitting would have occurred by the time the anodic current density of the specimen reached $3 \times 10^{-5}$ A/$cm^2$.

Salt Spray Analysis.

Corrosion protection properties of the coated aluminum alloy substrates were evaluated by exposing the substrates to a salt fog atmosphere generated by spraying 5 wt. % aqueous NaCl solution at 35±1.7° C. for 168 hours in accordance with ASTM B117 specifications.

Falling Sand Analysis.

Figure 2:
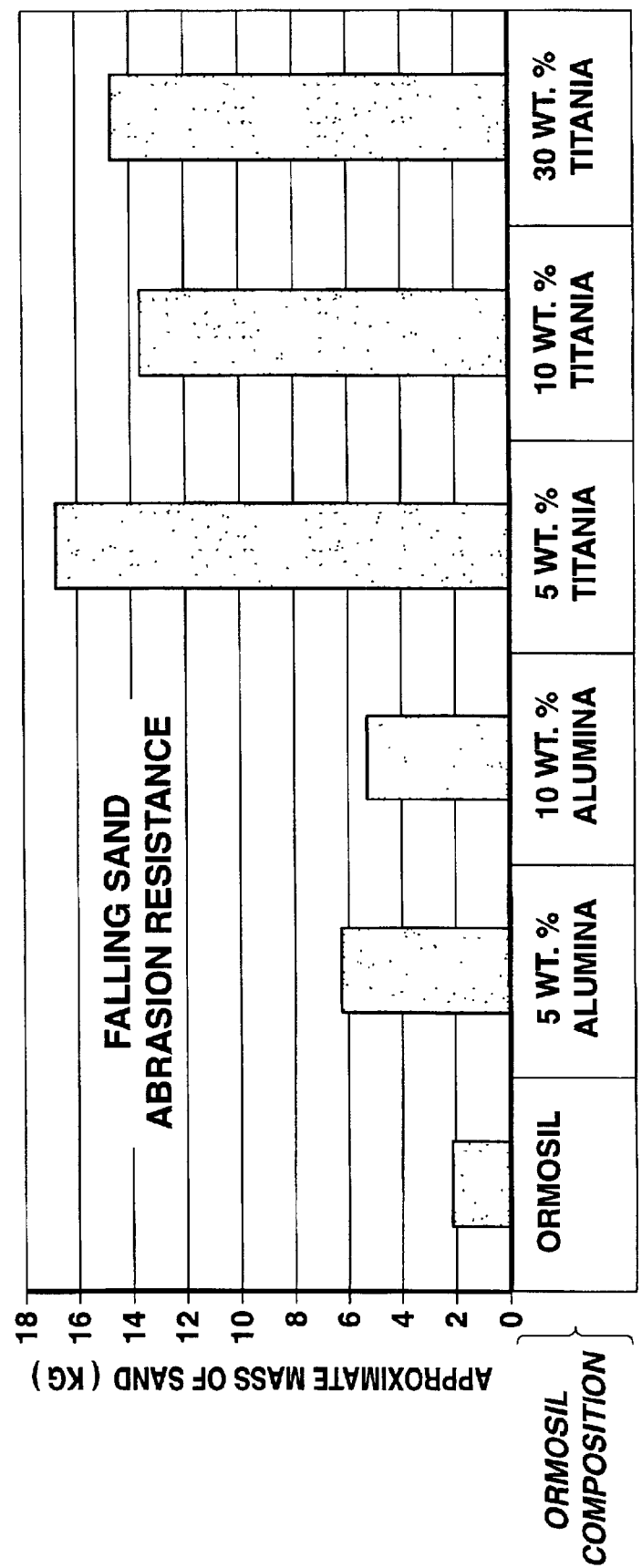
FIG. 2 shows the results of falling sand abrasion tests for Ormosil composites with and without the inorganic particles of the present invention.

Falling sand abrasion tests were performed in a manner in broad accordance with that described in ASTM D968 using 20–30 mesh sand as the abrading medium. In this study, the results are reported as kg of sand necessary to erode the as-deposited Ormosil composite from aluminum alloy substrate. Results of falling sand abrasion resistance tests for Ormosil composite coatings are shown in FIG. 2. The mass of sand necessary to erode the coating of the aluminum substrate increased from approximately 2 kg for the non-entrapped Ormosil composite coating to approximately 5–6 kg and 13–16 kg for $Al_2O_3$- and $TiO_2$-entrapped Ormosil composites, respectively. The $TiO_2$-entrapped Ormosil composites exhibited better abrasion resistance properties than $Al_2O_3$-entrapped Ormosil composites. These results indicate that there is an increase in the abrasion resistance of the inorganic particle-entrapped Ormosil composite coatings when compared to analogous films not containing inorganic particles.

TABLE 1

Electrochemical characteristics derived from potentiodynamic polarization curves for various coating compositions under investigation.

| Composition | $I_{corr} 10^7$, A/$cm^2$ | $E_{corr}$, mV | $E_{pit}$, mV | $R_{corr}$, k$\Omega cm^2$ |
|---|---|---|---|---|
| None[a] | 182 | −719 | −654 | 1.4 |
| Non-Entrapped Ormosil | 1.70 | −392 | +100 | 147 |
| 5 wt. % $Al_2O_3$ | 1.00 | −400 | +409 | 250 |
| 10 wt. % $Al_2O_3$ | 1.00 | −420 | +896 | 250 |
| 20 wt. % $Al_2O_3$ | 0.90 | −380 | +1194 | 281 |
| 5 wt. % $TiO_2$ | 1.12 | −248 | +403 | 223 |
| 10 wt. % $TiO_2$ | 1.00 | −274 | +759 | 250 |
| 30 wt. % $TiO_2$ | 1.00 | −268 | +1018 | 250 |
| 5 wt. % SiC | 1.26 | −331 | +79 | 198 |
| 10 wt. % SiC | 0.89 | −295 | +400 | 280 |
| 20 wt. % SiC[a] | — | — | — | — |

[a]Coating delaminated from the aluminum alloy substrate.

Additional Data.

Potentiodynamic polarization curve analysis indicates that there is a significant increase in corrosion protection afforded by coating the 2024-T3 aluminum alloy with an Ormosil composite coating as indicated by the increase in corrosion resistance, $R_{corr}$, from 1.4 k$\Omega cm^2$ for bare aluminum to 147 k$\Omega cm^2$, as shown in Table 1. The corrosion potential, $E_{corr}$, increased from −719 mV for bare aluminum to −392 mV, also indicating an enhancement in corrosion protection afforded by the Ormosil. Similarly, an increase in $E_{pit}$ values from −654 to +100 mV for bare and Ormosil-coated aluminum, respectively, were observed.

Significant enhancement in corrosion resistance properties were observed upon addition of micron-sized oxide particles, independent of the composition of the particles as shown in Table 1. For example, an increase in $R_{corr}$ from 147 to (198–281) k$\Omega cm^2$ was observed upon addition of various concentrations of $TiO_2$, $Al_2O_3$, or SiC particles to the Ormosil composite film. Similarly, $E_{pit}$ values were found to range from (+79 to +1194) mV for particle entrapped composite films, as compared to +100 for non-entrapped coatings. These results also demonstrate the increase in corrosion resistance afforded by particle incorporation.

The concentration of particles incorporated has a dramatic effect on the pitting potential, $E_{pit}$. For example, $E_{pit}$ values were found to increase from +409 to +1194 mV upon increasing the $Al_2O_3$ concentration from 5 to 20 wt. %. Similarly, increasing the $TiO_2$ concentration from 5 to 30 wt. % produced an increase in $E_{pit}$ from +403 to +1018 mV. SiC particles were found to follow the trend observed for the $TiO_2$ and $Al_2O_3$ particles; $E_{pit}$ values were found to increase from +79 to +400 mV for 5 and 10 wt. % SiC incorporation, respectively. However, the magnitude of enhancement was less than for the other oxide particles. Incorporation of ≧20 wt. % SiC reduced the adhesion properties of the particle-entrapped coating, as indicated by delamination of these coatings from the aluminum alloy surface.

Trends in results of 168 hour salt spray testing of micron-sized particle-entrapped Ormosil thin films correlate with the results of potentiodynamic polarization curve analysis.

For example, $Al_2O_3$ and $TiO_2$-entrapped Ormosil thin films were found to pass the 168 hour salt spray test, independent of particle concentration. For these Ormosil coatings, film failure in the form of localized pitting or corrosion was not observed. These results are expected, due to the observed $R_{corr}$ and $E_{pit}$ values which were in the (223 to 281) $k\Omega cm^2$ and (+403 to 1194) mV ranges, respectively. Some of these coatings were found to crack during the drying period following the accelerated salt spray test, presumably due to drying stresses due to dehydration of adsorbed water during the testing process. This behavior may be eliminated by applying a paint system (primer/topcoat for the prevention of adsorption of water) over the Ormosil composite coating in environments providing long term exposure to high humidity.

What is claimed is:

1. A metal substrate having a coating thereon, the coating comprising:
    an ormosil composite including an organic-inorganic hybrid polymeric matrix and a plurality of inorganic particles of a size of at least one (1) micron entrapped therein.

2. The substrate of claim 1 wherein substantially all of said plurality of inorganic particles each being not greater than 75 microns in its maximum dimension.

3. The substrate of claim 1 wherein substantially all of said plurality of inorganic particles each being not greater than 5 microns in its maximum dimension.

4. The substrate of claim 1 wherein the concentration of said plurality of inorganic particles is between 1% and 90% of the total weight of said ormosil composite.

5. The substrate of claim 4 wherein the concentration of said plurality of inorganic particles is between 5% and 30% of the total weight of said ormosil composite.

6. The substrate of claim 1 wherein said ormosil composite coating is of a thickness of between approximately 10 and 26 microns.

7. The substrate of claim 1 wherein said plurality of inorganic particles are selected from a group consisting of oxides, nitrides, carbides, and carbonitrides.

8. The substrate of claim 1 wherein said ormosil composite is formed through the hydrolysis and condensation of organically modified silane with an alkoxide precursor.

9. The substrate of claim 8 wherein said alkoxide precursor is a non-transition metal alkoxide.

10. A process for improving the abrasion and corrosion resistance of a metal prone to abrasion and corrosion, comprising:
    applying to the metal a coating of an ormosil organic-inorganic hybrid polymeric matrix;
    wherein a plurality of inorganic particles of a size of at least one micron in maximum dimension are entrapped in said ormosil matrix.

11. The process of claim 10 further including applying said ormosil composite coating in a sol-gel process.

12. An abrasion and corrosion resistant coating for application on a metal, said coating comprising an ormosil composite, said ormosil composite including an organic-inorganic hybrid polymeric matrix and a plurality of inorganic particles of a size of at least one (1) micron entrapped herein and said coating imparting corrosion resistance to the metal.

13. The coating of claim 12 wherein substantially all of said plurality of inorganic particles each being not greater than 75 microns in its maximum dimension.

14. The coating of claim 12 wherein substantially all of said plurality of inorganic particles each being not greater than 5 microns in its maximum dimension.

15. The coating of claim 12 wherein the concentration of said plurality of inorganic particles is between 1% and 90% of the total weight of said ormosil composite.

16. The coating of claim 15 wherein the concentration of said plurality of inorganic particles is between 5% and 30% of the total weight of said ormosil composite.

17. The coating of claim 12 wherein said ormosil composite coating is of a thickness of between approximately 10 and 26 microns.

18. The coating of claim 12 wherein said plurality of inorganic particles are selected from a group consisting of oxides, nitrides, carbides, and carbonitrides.

19. The coating of claim 12 wherein said ormosil composite is formed through the hydrolysis and condensation of organically modified silane with an alkoxide precursor.

20. The coating of claim 19 wherein said alkoxide precursor is a non-transition metal alkoxide.

21. A substrate having a coating thereon, the coating comprising:
    an ormosil composite including an organic-inorganic hybrid polymeric matrix and a plurality of inorganic particles of a size of at least one (1) micron entrapped therein; and
    wherein substantially all of said plurality of inorganic particles each being not greater than 5 microns in its maximum dimension.

22. A substrate having a coating thereon, the coating comprising:
    an ormosil composite including an organic-inorganic hybrid polymeric matrix and a plurality of inorganic particles of a size of at least one (1) micron entrapped therein;
    wherein a concentration of said plurality of inorganic particles is between 5% and 30% of a total weight of said ormosil composite.

23. A substrate having a coating thereon, the coating comprising:
    an ormosil composite including an organic-inorganic hybrid polymeric matrix and a plurality of inorganic particles of a size of at least one (1) micron entrapped therein;
    wherein said ormosil composite coating is of a thickness of between approximately 10 and 26 microns.

24. An abrasion and corrosion resistant coating comprising:
    an ormosil composite, said ormosil composite including an organic-inorganic hybrid polymeric matrix and a plurality of inorganic particles of a size of at least one (1) micron entrapped therein;
    wherein substantially all of said plurality of inorganic particles each being not greater than 5 microns in its maximum dimension.

25. An abrasion and corrosion resistant coating comprising:
    an ormosil composite, said ormosil composite including an organic-inorganic hybrid polymeric matrix and a plurality of inorganic particles of a size of at least one (1) micron entrapped therein;
    wherein said ormosil composite coating is of a thickness of between approximately 10 and 26 microns.

* * * * *